United States Patent [19]

Harmon

[11] 3,738,029

[45] June 12, 1973

[54] DREDGING HEAD WITH PIVOTALLY MOUNTED MUD SHIELD

[75] Inventor: James D. Harmon, Minneapolis, Minn.

[73] Assignee: Inland Service Corporation, Minneapolis, Minn.

[22] Filed: Dec. 10, 1970

[21] Appl. No.: 96,705

[52] U.S. Cl. .................................. 37/66, 37/57
[51] Int. Cl. ................................... E02f 3/92
[58] Field of Search ................ 37/55, 57, 66; 114/42; 171/85

[56] References Cited
UNITED STATES PATENTS

| | | | |
|---|---|---|---|
| 3,521,387 | 7/1970 | Degelman | 37/66 |
| 3,512,280 | 5/1970 | Di Perna | 37/57 |
| 2,204,584 | 6/1940 | Flower | 37/55 X |
| 1,070,271 | 8/1913 | Lybeck | 37/55 |
| 3,171,220 | 3/1965 | Schram | 37/66 |
| 2,362,402 | 11/1944 | Reiter | 171/85 X |
| 2,686,996 | 8/1954 | Reiter | 171/85 |

Primary Examiner—Robert E. Pulfrey
Assistant Examiner—Clifford D. Crowder
Attorney—Williamson, Palmatier & Bains and Conrad A. Hansen

[57] ABSTRACT

A dredging head with a pivotally mounted mud shield and cooperating intake assembly. A head located at the end of a dredge boom has digging and conveying screw augers attached to a rotating shaft to loosen material such as mud, silt, and weeds from the bottom of a body of water and convey it toward an intake assembly which includes a suction intake conduit, a rotor, a stationary anvil, and an arcuate bar assembly. The mud shield confines material near the augers so the material can be conveyed by the augers to the rotor, stationary anvil, and arcuate bar assembly which cooperate to cut and shred the dredged material as it is pulled into the suction intake conduit. The arcuate bar assembly reinforces both suction intake conduit and stationary anvil and provides support for the rotor to prevent shaft deformation if collision with an underwater obstruction flexes the shaft against the arcuate bar assembly.

11 Claims, 5 Drawing Figures

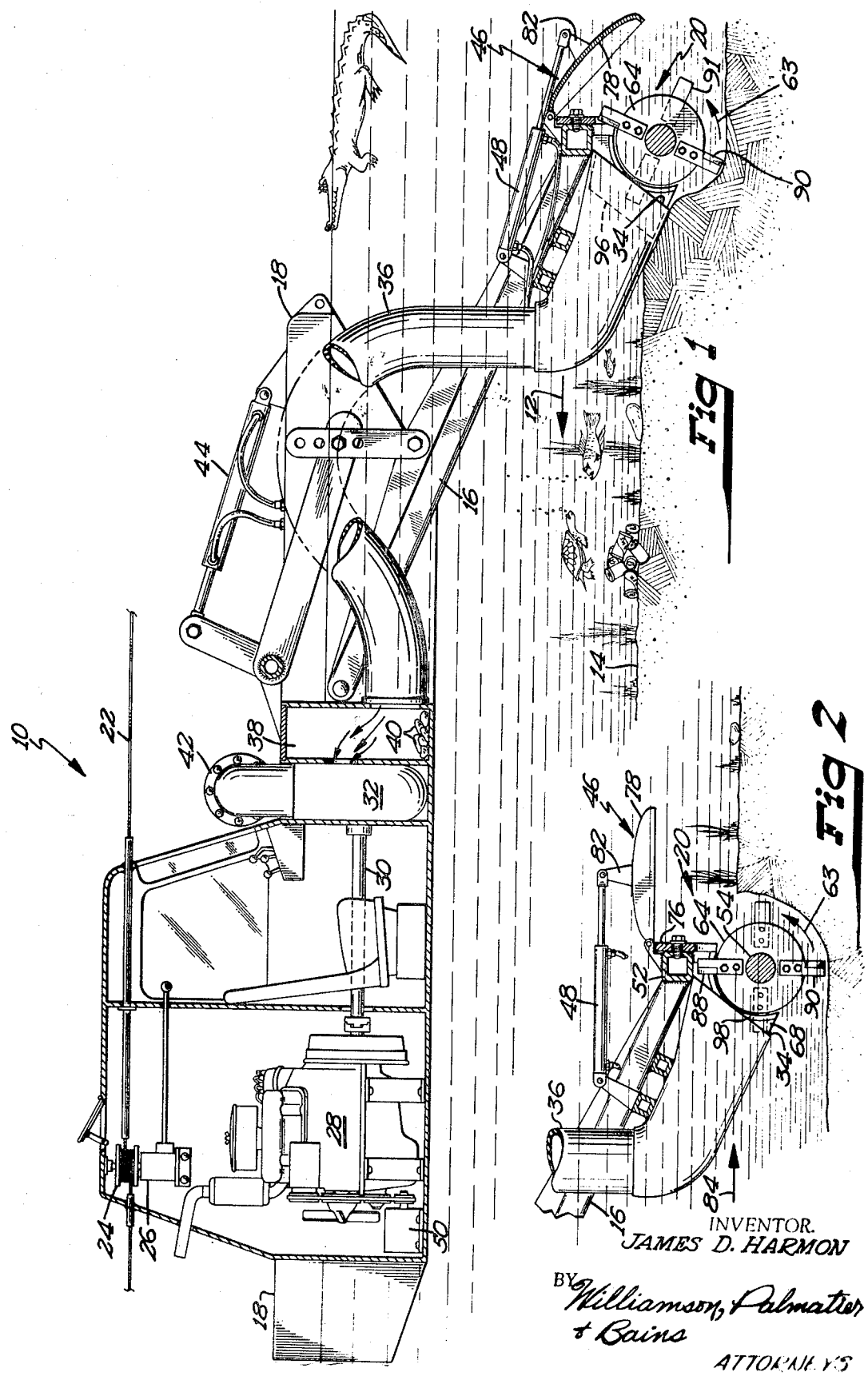

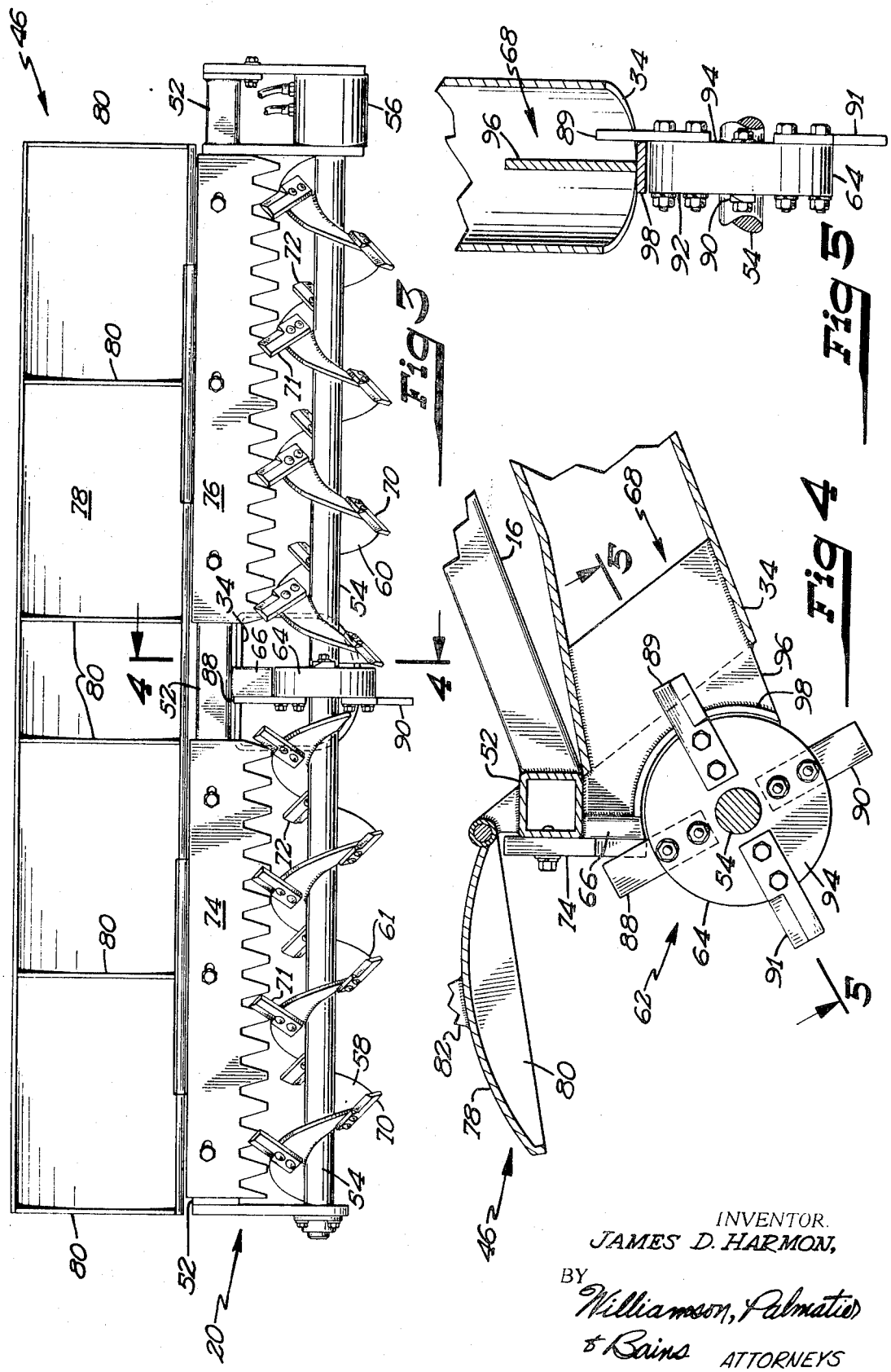

DREDGING HEAD WITH PIVOTALLY MOUNTED MUD SHIELD

The purpose of the foregoing abstract is to enable the Patent Office and the public generally, and especially the scientists, engineers, or practitioners in the art who are not familiar with patent or legal terms of phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND OF THE INVENTION

My invention comprises an improvement of the dredging head disclosed in co-pending United States patent application Ser. No. 814,232, filed April 4, 1969 by Norbert V. Degelman entitled "Dredging Machine," now U. S. Pat. No. 3,521,387. That application disclosed a pumping dredge for removing material such as mud, silt, weeds, and the like from the bottom of bodies of water such as lakes, marshes, and rivers. The disclosed dredge moved forward or rearward along a fixed cable propelling a dredging head along the bottom of the body of water. The head extended horizontally and transversely of a boom pivotally mounted to the dredge and carried a rotating horizontal shaft having a pair of screw augers for loosening material from the bottom. The screw augers were spaced from each other on the shaft and carried a plurality of cutting blades for loosening material form the bottom. The rotation of the augers conveyed loosened material to a suction intake conduit between the augers. The loosened material was pumped into the conduit and away from the dredging area.

As the dredging head moved forwardly along the bottom, all the material loosened by the augers was not conveyed to the intake conduit; the augers rotated with lowermost edge of the augers moving forwardly and consequently hurling some of the loosened material upward out of reach of the augers. Such material was not conveyed by the augers to the intake conduit and thus was not always removed from the bottom.

When the dredge moved rearwardly, an increased amount of loosened material escaped from the augers because the material could be hurled both upwardly and forwardly away from the augers. The present invention includes a mud shield formed of a panel of sturdy material overlying the augers to confine material near the augers, permitting more material to be removed from the bottom.

Because the addition of a mud shield to the dredging head increases the quantity of loosened material confined near the augers for removal, it is helpful to modify the intake assembly of the dredging head to handle the increased quantity of material.

SUMMARY OF THE INVENTION

The invention comprises an improved dredging head for a pumping dredge. A pivotally mounted mud shield formed of a panel of sturdy material overlies the rotating augers of the head and confines loosened material near the augers. Means are provided to vary the position of the mud shield to adapt it to forward and rearward dredging at various water depths.

An intake assembly at the center of the dredging head has a suction intake conduit, a rotor, a stationary anvil, and an arcuate bar assembly. The rotor is attached to the rotating shaft on which the augers are mounted and is provided with a plurality of cutting blades. The rotor with its blades cooperates with the stationary anvil to cut material such as weeds and mud clods therebetween. This diminishes the amount of oversize material which might otherwise clog the suction intake conduit.

The arcuate bar assembly reinforces the intake conduit and divides it in half to prevent large rocks or clods from entering. The bar assembly is aligned with and confronts the rotor, and the rotor cutting blades cooperate with the bar assembly to cut and shred material and hurl oversize rocks or clods from the intake conduit thereby further protecting the conduit from obstruction. The bar assembly has an arcuate bar which provides support for the rotor so as to prevent shaft deformation if collision with an underwater obstruction flexes the shaft against the arcuate bar assembly.

BRIEF DESCRIPTION OF THE DRAWINGS

FIG. 1 is a sectional side view of a dredge embodying my improved dredging head showing the dredge moving rearwardly to clear the bottom of a body of water. The screw augers of the dredging head have been omitted from FIG. 1 for simplification.

FIG. 2 is a side view of the dredging head and lower boom of FIG. 1 showing them operating in a forward direction.

FIG. 3 is a front elevational view of the dredging head of FIGS. 1 and 2 showing my mud shield and improved intake assembly.

FIG. 4 is a sectional side view of the intake assembly of FIG. 3 taken along cutting plane 4—4.

FIG. 5 is a sectional view of the rotor and arcuate bar assembly of my invention taken along cutting plane 5—5 of FIG. 4.

DESCRIPTION AND OPERATION OF THE INVENTION

FIG. 1 shows a dredge 10 moving rearwardly as indicated by arrow 12 and clearing the bottom 14 of a marsh or other body of water. The dredge 10 has a boom 16 pivotally mounted between dredge supporting pontoons 18, one of which is omitted for simplification, and carries a dredging head 20 at the lower end of the boom.

A cable 22 extends through the dredge 10 with one end of the cable anchored on shore and the other at a distance out in the marsh. Winch 24 powered by a reversible hydraulic motor 26 pulls the dredge forwardly or rearwardly along the cable 22 propelling the dredging head 20 over the marsh bottom to clear a swath. After clearing a swath the cable's shore anchorage point is moved to one side permitting the dredge to clear an adjoining swath.

A power source 28, such as a diesel engine, is mounted on the rear of the dredge and is connected through axle 30 to a dredge pump 32 which draws loosened material upward from the marsh bottom.

A suction intake conduit 34 begins at the center of the head 20 and is connected to a flexible hose 36 leading to a rock collection box 38 in which rocks 40 pumped upward from the bottom are deposited. Dredged material is pumped through box 38 and into dredge pump 32 which has an outlet 42 connected to a series of discharge hoses (not shown) which deliver the dredged material to a desired depository.

Boom 16 is raised or lowered by a hydraulic piston 44 to position the head 20 at the desired dredging depth. The head 20 has a pivotally mounted mud shield 46 which can be rotated about an axis substantially parallel to the head by hydraulic piston 48.

The hydraulic pistons 44 and 48 are powered by hydraulic pump 50 which is connected by a belt drive to power source 28. The hydraulic pump 50 also supplies power to all hydraulic motors of the dredge. Hydraulic lines between pump 50 and the motors or cylinders have been omitted for simplification.

Referring now to FIGS. 3 and 4, the dredging head 20 has a frame 52 attached to boom 16 and carrying rotatable shaft 54 which is turned by hydraulic motor 56.

The rotatable shaft 54 has a pair of spaced digging and conveying screw augers 58 and 60 mounted thereon and extending horizontally and transversely of the forward direction.

The hydraulic motor 56 turns augers 58 and 60, rotating the lowermost edges 61 of the augers forwardly as shown by arrow 63 in FIGS. 1 and 2. The direction of rotation 63 is the same for forward or rearward operation of the dredge 10. The augers have a plurality of cutting blades such as 70, 71 and 72 which cooperate with toothed cutter bars 74 and 76 to cut weeds, mud clods, and other loosened material therebetween.

Referring now to FIGS. 3 and 4, a moveable mud shield 46 formed of a panel 78 of sturdy material, such as sheet steel, is pivotally mounted to the frame 52 adjacent toothed cutter bars 74 and 76 for rotation about an axis substantially parallel to the head so as to be moveable between a plurality of positions over-lying the augers. The panel 78 may have an arcuate cross section to provide additional strength; a plurality of ribs 80 provide additional strength and rigidity to the panel. A bracket 82 on the panel 78 attaches to hydraulic piston 48 (FIG. 1) which serves as a means to vary the angular position of the panel about the axis. The hydraulic piston 48 is pivotally mounted between boom 16 and bracket 82.

Since the depth below the water surface at which the dredging head is used varies, the angle between boom 16 and march bottom 14 may vary considerably; for deeper bottoms the angle is greater than for shallow bottoms. As a result of this variation the mud shield position should be adjusted to the operating depth.

When the dredge is operated in a rearward direction 12 as shown in FIG. 1 the mud shield 46 is preferably lowered to a position like that shown which confines much loosened material between the mud shield, toothed cutter bars, augers, and marsh bottom. The mud shield, toothed cutter bars, and augers cooperate to confine the loosened material between them and the marsh bottom so the suction intake conduit can remove the confined material. When the dredge is operated in a forward direction 84 as shown in FIG. 2, the mud shield occupies a different position, overlying the augers and the bank. The augers can be positioned to remove either relatively thick or thin layers of material from the bottom; the layer thickness affects the mud shield position. For example, when removing a relatively thick layer of material the augers confront a bank 86 (FIG. 2) and the shield should overlie but not dig into the bank. If the bank 86 were less high, the shield 46 would be lowered to be nearer the top of the bank thereby increasing the confinement of loosened material.

When the dredge is being transported by truck or stored, the mud shield is kept in the raised position illustrated by FIG. 3 to facilitate storage by shortening the overall length of the dredge.

An intake assembly 62 (FIG. 4) is located at the center of the head 20 and includes a rotor 64 on shaft 54, a stationary anvil 66, the suction intake conduit 34, and a stationary arcuate bar assembly 68.

Rotor 64 on shaft 54 is mounted between the augers 58 and 60 and carries four cutting blades 88, 89, 90, and 91 with a pair of the blades being mounted on each side of the rotor. The rotor 64 may be disk shaped with flat sides 92 and 94 separated by a circular rim, cutting blades being carried on the flat sides.

A stationary anvil 66 (FIGS. 3, 4) formed of rigid material such as steel, is attached to frame 52 and cooperates with rotor 64 and the cutting blades thereon to cut weeds, clods and other material therebetween.

Suction intake conduit 34 begins adjacent anvil 66 between augers 58 and 60 and is securely attached to frame 52. The conduit 34 receives and removes loosened material conveyed thereto by the rotating augers.

The stationary arcuate bar assembly 68, which includes divider 96 and a sturdy arcuate bar 98, is mounted upright in suction intake conduit 34 (FIGS. 4, 5) and divides the conduit substantially in half. The bar 98 is welded to divider 96 and anvil 66 and provides a reinforcement for the anvil. The arcuate bar 98 has a width slightly less than that of the rim 95 of the rotor, so a pair of rotor cutting blades passes on each side of the arcuate bar assembly 68.

The arcuate bar assembly 78 serves a number of purposes. It cooperates with rotor 64 to cut and shred material therebetween, and when oversize rocks enter the suction intake conduit 34 the rotating blades hurl them outward, away from the conduit. The arcuate bar assembly with its divider 96 prevents rocks from lodging between the rotating blades of the rotor and supports the suction intake conduit, giving it additional strength and rigidity while dividing the conduit substantially in half to regulate the maximum size of material which can enter the conduit 34. The arcuate bar 98 is spaced from and confronts the rim 95 of rotor 64 and provides a support against which rotor 64 can bear when shaft 54 is flexed rearwardly toward arcuate bar 98 as, for example, might occur when the shaft and augers encounter a major obstruction on the marsh bottom; the bar thus insures that the shaft 54 retains a predetermined relationship with the suction intake conduit 34 in which the shaft cannot be seriously deformed.

In operation, when a marsh bottom is to be dredged to remove weeds, silt, mud, and like material the cable 22 is extended through the dredge 10 and anchored on shore and at a distance out in the marsh. The dredge 10 is winched along the cable 22 to a convenient starting location in the marsh, nd the boom 16 is lowered to position the head 20 at a desired dredging depth. If the dredge is to be moved forwardly, the mud shield 46 is moved to a position similar to that shown in FIG. 2.

The dredge moves forward with shaft 54 rotating, and the cutting blades of screw augers 58 and 60 dig into the marsh bottom, loosening material. Weeds and mud clods are cut and broken between the blades and toothed cutter bars 74 and 76 (FIG. 3). Material which is hurled upwardly and away by the spinning augers is intercepted to a considerable degree by mud shield 46 and confined near the augers.

The rotating augers convey the confined loosened material to the intake assembly 62 where the material encounters rotor 64 with its cutting blades as the material leaves the augers. The rotor and its blades cooperate with stationary anvil 66 and arcuate bar assembly 68 to further cut and shred the loosened material and break up any remaining clods before they enter the suction intake conduit. Rocks conveyed to the conduit 34 which are large enough to clog the conduit are hurled away by the blades of the rotor 64.

If the rotor, shaft, or augers strike major obstructions on the marsh bottom which force the shaft rearwardly, arcuate bar assembly 68 supports the rotor and shaft thereby preventing any serious deformation of the shaft.

Spinning rotor 64 maintains the loosened material reaching intake assembly 62 in suspension to aid suction intake conduit 34 in removing the material. The dredge pump 32 draws the material upward through flexible hose 36 and into rock collection box 38. Most rocks entering the intake conduit 34 are collected in box 38 and an operator periodically removes them. The remaining dredged material enters dredge pump 32 and is expelled at pump outlet 42 into a series of hoses which transport the material away from the dredging area.

When the dredge reaches the end of a swath, the shore anchor point is moved to one side to permit the dredge to move rearwardly on a new cutting swath adjacent to the first. As the rearward swath is begun, an operator adjusts the position of mud shield 46 by activating hydraulic piston 48 to rotate mud shield 46 to a position like that shown in FIG. 1. The dredge is now ready for rearward operation. Since rearward operation of the dredging head is otherwise similar to forward operation, the rearward operation will not be described in further detail.

While I have described a preferred embodiment of the present invention, it should be understood that various changes, adaptations and modifications may be made therein without departing from the spirit of the invention and the scope of the appended claims.

I claim:

1. A head to be carried by a boom of a forward and rearward moving, pumping dredge to loosen and remove material from the bottom of a body of water comprising:
    an elongate frame attached to the boom and extending transversely of the boom;
    a suction intake conduit attached to the frame and supplying material to the dredge pump;
    a shaft rotatably mounted to the frame, and drive means revolving the shaft;
    a pair of spaced digging and conveying screw augers mounted on the shaft and extending horizontally and transversely of the forward direction and outwardly from the suction intake conduit, the augers loosening and conveying material toward the suction intake conduit as the dredge head moves along the bottom;
    an elongate plate-like bar mounted on the elongate frame and extending along the length of said augers, the bar being oriented in a generally upright position above the augers and in closely spaced relation thereto; and
    an adjustable elongate panel of sturdy material pivotally mounted on the elongate frame and above said plate-like bar and extending along said elongate frame and plate-like bar, said panel being concavely shaped with the concave side facing and overlying the screw augers to conform to the general direction of flow of material created by the augers, said panel being disposed forwardly of the suction intake conduit and plate-like bar to cooperate with the bar in confining loosened material near the augers so the augers can convey the loosened material to the suction intake conduit for removal.

2. The combination according to claim 1 wherein the panel extends forwardly of the augers and the augers rotate with the lowermost edges of the augers moving forwardly to loosen material, the material being confined by panel, augers, and water bottom, and the suction intake conduit removing the confined material.

3. The combination according to claim 1 and including a plurality of cutting blades on the augers and revolving therewith, said bars including teeth cooperating with the revolving blades of said screw augers.

4. The combination according to claim 1 including means to vary the angular position of the panel.

5. A dredging head intake assembly for removing material loosened from the bottom of a body of water by a pair of augers spaced from one another on a shaft which is rotatably mounted to a frame comprising:
    a rotor mounted on the shaft between the augers for rotating movement therewith, said rotor carrying a plurality of cutting blades;
    a stationary anvil attached to the frame and arranged to cooperate with the rotor and blades to cut material therebetween;
    a suction intake conduit adjacent the anvil and between the pair of augers to receive and remove loosened material; and
    a stationary arcuate bar assembly maintaining the shaft and intake conduit in a predetermined relation with one another, said bar assembly attached to the conduit and frame reinforcing and dividing the conduit.

6. The combination according to claim 5 wherein said arcuate bar assembly is spaced from the rotor and arranged to support the rotor when the shaft is flexed against the bar assembly.

7. The combination according to claim 5 wherein the arcuate bar assembly contacts said anvil to provide a reinforcement for the anvil.

8. The combination according to claim 5 wherein the arcuate bar assembly includes an arcuate bar and a divider, the divider supporting the arcuate bar and attached to the conduit and frame.

9. The combination according to claim 5 wherein:
    said rotor is disk shaped with flat sides separated by a circular rim, each side carrying at least one cutting blade; and
    said arcuate bar assembly has a width less than the width of the rotor and confronts the rim of the rotor so that at least one cutting blade passes on each side of the arcuate bar assembly when the shaft rotates, the bar assembly cooperating with the rotor and blades to cut material.

10. The combination according to claim 5 wherein a panel of sturdy material is mounted overlying the augers to confine loosened material near the augers so material can be conveyed to the suction intake conduit by the augers and removed.

11. The combination according to claim 10 wherein said panel is pivotally mounted for movement about an axis substantially parallel to the head so the panel can overlie the head in a plurality of angular positions.

* * * * *